(12) United States Patent
Eakins et al.

(10) Patent No.: US 11,060,602 B2
(45) Date of Patent: Jul. 13, 2021

(54) CONVECTIVE COOLING DEVICES AND METHODS FOR COOLING HOUSINGS

(71) Applicant: ABB Schweiz AG, Baden (CH)

(72) Inventors: Will J. Eakins, Coventry, CT (US);
Stefan Rakuff, Windsor, CT (US);
Andrew M. Salm, West Hartford, CT (US)

(73) Assignee: ABB Schweiz AG, Baden (CH)

( * ) Notice: Subject to any disclaimer, the term of this patent is extended or adjusted under 35 U.S.C. 154(b) by 84 days.

(21) Appl. No.: 16/160,133

(22) Filed: Oct. 15, 2018

(65) Prior Publication Data
US 2020/0116250 A1   Apr. 16, 2020

(51) Int. Cl.
| | | |
|---|---|---|
| *F16H 57/04* | (2010.01) | |
| *F16H 57/031* | (2012.01) | |
| F16H 57/02 | (2012.01) | |
| F28F 3/02 | (2006.01) | |
| F28F 3/06 | (2006.01) | |

(52) U.S. Cl.
CPC ....... *F16H 57/0416* (2013.01); *F16H 57/031* (2013.01); *F16H 57/0417* (2013.01); *F16H 2057/02026* (2013.01); *F28F 3/02* (2013.01); *F28F 3/06* (2013.01)

(58) Field of Classification Search
CPC ............... F16H 57/0416; F16H 57/031; F16H 57/0417; F16H 2057/02026; F28F 3/02; F28F 3/06
USPC .......................................................... 165/46
See application file for complete search history.

(56) References Cited

U.S. PATENT DOCUMENTS

| | | | | |
|---|---|---|---|---|
| 6,093,961 A | * | 7/2000 | McCullough | H01L 23/3737 174/16.3 |
| 7,399,919 B2 | * | 7/2008 | McCutcheon | F28D 15/0241 174/16.3 |
| 8,830,681 B2 | * | 9/2014 | Liu | H05K 7/20445 361/714 |
| 2016/0322280 A1 | * | 11/2016 | Schmit | H01L 23/043 |

OTHER PUBLICATIONS

Enzotech, "Talon Clip," downloaded from the Internet at http://www.enzotech.com/talonclip-introduction.html on Sep. 21, 2018, 1 p.
Advanced Thermal Solutions, "maxiGRIP Heat Sink Attachment," downloaded from the Internet at https://www.qats.com/Heat-Sink/maxiGRIP on Sep. 21, 2018, 1 p.

* cited by examiner

*Primary Examiner* — Joel M Attey
(74) *Attorney, Agent, or Firm* — Leydig, Voit & Mayer, Ltd.

(57) ABSTRACT

A cooling device includes a body formed into an elongate strip having upper and lower surfaces. The elongate strip is configured to contact the housing along the lower surface for conductive heat transfer from the housing to the body. Each of a plurality of cooling fins is attached to the strip and extends from one end attached to the upper surface of the strip another, free end. The device includes a first tab disposed at one end of the elongate strip, and a second tab disposed at another end of the elongate strip. The elongate strip is made from a compliant material such that the elongate strip conforms to a shape of the housing when the first and second tabs are connected to the housing and a majority of the lower surface contacts the housing. The fins are arranged to convectively dissipate heat from the body.

17 Claims, 16 Drawing Sheets

CONVECTIVE COOLING DEVICES AND METHODS FOR COOLING HOUSINGS

TECHNICAL FIELD

The present disclosure relates to cooling of equipment generating heat within enclosed housings, and, more particularly, to securement of cooling fins on exterior surfaces of heat generating equipment housings and methods of assembly thereof.

BACKGROUND

Many types of heat generating equipment operating inside of housings (e.g., gear reducers) are thermally limited due to internal losses generating heat. Cooling systems become important add-ons to achieve competitive power densities for at least some known heat generating equipment operating inside housings. The dominant effect that limits the achievable overall heat transfer (e.g., by cooling) of a gear reducer, for instance, is the convection at the outer housing surfaces. Convection can be increased with forced airflow around the housings or extended surfaces known as fins.

The incorporation of fins onto housings to improve cooling has been proposed in the past, for example, by casting cooling fins into the casing itself. However, while cast fins may improve cooling of the housing, their effectiveness (fin efficiency) is limited. In the case of cast iron housings with cast iron fins, fin efficiency is particularly low as compared to those made from, for instance, aluminum, which has a greater thermal conductivity than cast iron. Furthermore, cast fins included on housings adds weight to the housing, and increases the packaging envelope of the housing.

SUMMARY OF THE DISCLOSURE

One aspect of the disclosure is a convective cooling device configured for attachment to a housing The convective cooling device includes, comprising a body shaped as an elongate strip. The body includes upper and lower surfaces extending along a longitudinal axis. The body is configured to contact the housing along the lower surface for heat transfer from the housing to the body. The convective cooling device includes a plurality of cooling fins attached along the upper surface. Each of the plurality of elongate fins are connected to the upper surface of the elongate strip at one end, and they extend away from the upper surface of the elongate strip at another, free end. The convective cooling device includes a first tab disposed at one end of the elongate strip, and a second tab disposed at another end of the elongate strip. The body is made from a compliant material such that the body conforms to a shape of the housing when the first and second tabs are connected to the housing and a majority of the lower surface contacts the housing. The fins are arranged to dissipate heat from the body.

Another aspect of the disclosure is a convective cooling arrangement for a housing. The convective cooling arrangement includes a housing having an exterior surface. The convective cooling arrangement includes one or more heat sinks. Each of the one or more heat sinks includes a generally flat body having a plate shape. The generally flat body includes upper and lower surfaces. The generally flat body of each of the one or more heat sinks is connected to the exterior surface of the housing and configured to conductively absorb heat from the housing. The convective cooling arrangement includes a plurality of cooling fins attached along the upper surface of each of the one or more heat sinks. Each of the plurality of cooling fins are connected to the upper surface of each of the one or more heat sinks and extending away from the upper surface. The convective cooling arrangement includes at least one fastener disposed to fasten at least one of the one or more heat sinks to the housing.

Yet another aspect of the disclosure is a method for cooling a housing. The method includes providing a heat sink having a body, the body including upper and lower surfaces. The method includes thermally attaching the lower surface of the body to an exterior surface of the housing. The step of thermally attaching the body to the housing includes deforming the body such that the body conforms to a shape of the housing. The method includes conductively cooling the housing by absorbing heat into the body. The method includes providing a plurality of fins arranged along the upper surface of the body. Each of the plurality of elongate fins is connected to the upper surface of the body at one end, and they extend away from the upper surface of the body at another, free end. The method includes convectively dissipating heat from the body through the fins.

Further and alternative aspects and features of the disclosed principles will be appreciated from the following detailed description and the accompanying drawings. As will be appreciated, the principles related to addition of cooling systems and methods of cooling equipment disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
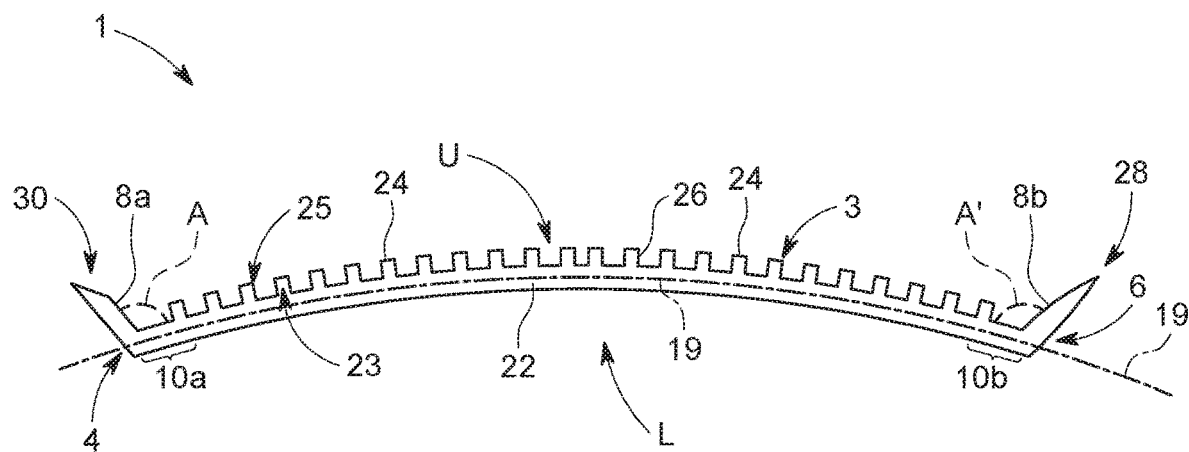
FIG. 1 is a side view of a convective cooling device according to an embodiment of the disclosure.

FIG. 1 is a side view of a convective cooling device 1 according to an embodiment of the disclosure. The convective cooling device 1 includes a body of a heat conductive material formed into an elongate strip 3 having upper ("U") and lower ("L") surfaces extending along a longitudinal axis 19. The convective cooling device 1 includes a plurality of cooling fins 24 attached along at least a portion of the upper surface U of the elongate strip 3. In an embodiment, the plurality of cooling fins 24 are elongate fins 24. Each of the plurality of elongate fins 24 is connected to the upper surface U of the elongate strip 3 at one end (e.g., a first fin end 23 proximal a base 22 of the elongate strip 3). Each of the plurality of elongate cooling fins 24 extends away from the upper surface U of the elongate strip 3 at another, free end (e.g., a second fin end 25 distal the base 22). In an embodiment, the plurality of fins 24 is formed or attached along the upper surface U of the strip 3 transversely with respect to the longitudinal axis 19 of the strip 3. The cross section of the fins 24 can be rectangular, trapezoidal, or triangular. The fins can also be formed as cylinders that extend outward from the base 22. In an embodiment, at least a portion of the strip 3 includes the plurality of fins 24 in thermal contact with the base 22 to allow heat transfer from the base 22 to an outer surface 26 of the cooling fins 24.

The convective cooling device 1 includes a first tab 8a disposed at one end (e.g., a first end 4) of the elongate strip 3. The convective cooling device 1 includes a second tab 8b disposed at another end (e.g., a second end 6 opposite the first end 4) of the elongate strip 3. In an embodiment, at least one of the first end 4 and the second end 6 of the strip 3 includes an outward tapered tip 28, but in alternative embodiments, the first end 4 or the second end 6 of the strip 3 can include an inward tapered tip 30, or a square or rectangular tip 31 (see, e.g., FIG. 4).

Figure 2:
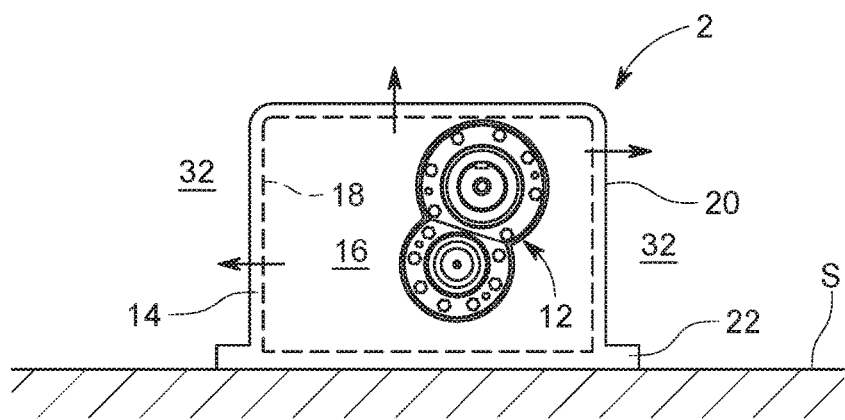
FIG. 2 is a side view of an output side of a gearbox housing.

Referring to FIG. 2, a side view of an output side of a gearbox housing 2 is shown. In this embodiment, the base 22 of the elongate strip 3 extends between the first end 4 and the second end 6. The first tab 8a is formed at an angle, A, relative to a plane 10a defined by a portion of the elongate strip 3 adjacent the first tab 8a. As shown, in FIG. 1, the plane 10a is parallel to the longitudinal axis 19 when the elongate strip 3 is laid flat. The second tab 8b is formed at an angle, A', relative to a plane 10b defined by a portion of the elongate strip 3 adjacent the second tab 8b. The plane 10b is parallel to the longitudinal axis 19 when the elongate strip 3 is laid flat. In the illustrated embodiment, the first tab 8b at the first end 4 forms the angle A relative to its adjacent plane 10a that is equal to the angle A' formed by the second tab 8b at the second end 6 relative to its adjacent plane 10b, but it should be appreciated that the angles A and A' may be different. Either (or both) of the angles A and A', depending on the requirements of a particular installation, may be an acute, obtuse, or right angle, and may even be formed at zero (or 180) degrees relative to any adjacent straight sections of the elongate strip.

The gearbox housing 2 shown in FIG. 2 includes a shell 14 enclosing a cavity 16. An exterior surface 20 of the housing 2 faces, and may be exposed to, an external ambient environment 32, which may be at least partially enclosed from the outdoors. In an embodiment, the shell 14 includes an interior surface 18 facing the cavity 16. During operation, heat-generating equipment 12 is positioned inside the cavity 16. In the embodiment shown in FIG. 2, the heat generating equipment 12 includes gears and the housing 2 is a gearbox housing, but any other mechanical or electrical equipment can be housed within the housing 2. For example, the heat generating equipment 12 can include motors, generators, mechanical power transmissions, engines, turbines and turbomachinery, and housings for storing materials at high temperatures.

The housing 2 includes a base plate 22 in contact with a surface S (e.g., a floor) in the illustrated embodiment. During operation, the heat generating equipment 12 operating inside the housing 2 generates heat. When the ambient environment 32 is at a lower temperature than the cavity 16 of the housing 2, heat may be transferred from the heat generating equipment 12, to the cavity 16 by convection, to the shell 14 of the housing 2, also by convection, through the shell 14 by conduction, and to the ambient environment 32 by convection. Heat transfer occurring in this manner during operation may occur through one or more heat transfer mechanisms including, without limitation, conductive, convective, and radiative heat transfer. In at least some known housings 2, heat transfer from the inside to the exterior of the housing 2 operates to cool the heat generating equipment 12 both during operation and after operation has ceased, in a condition sometimes referred to as soakback.

Figure 3:
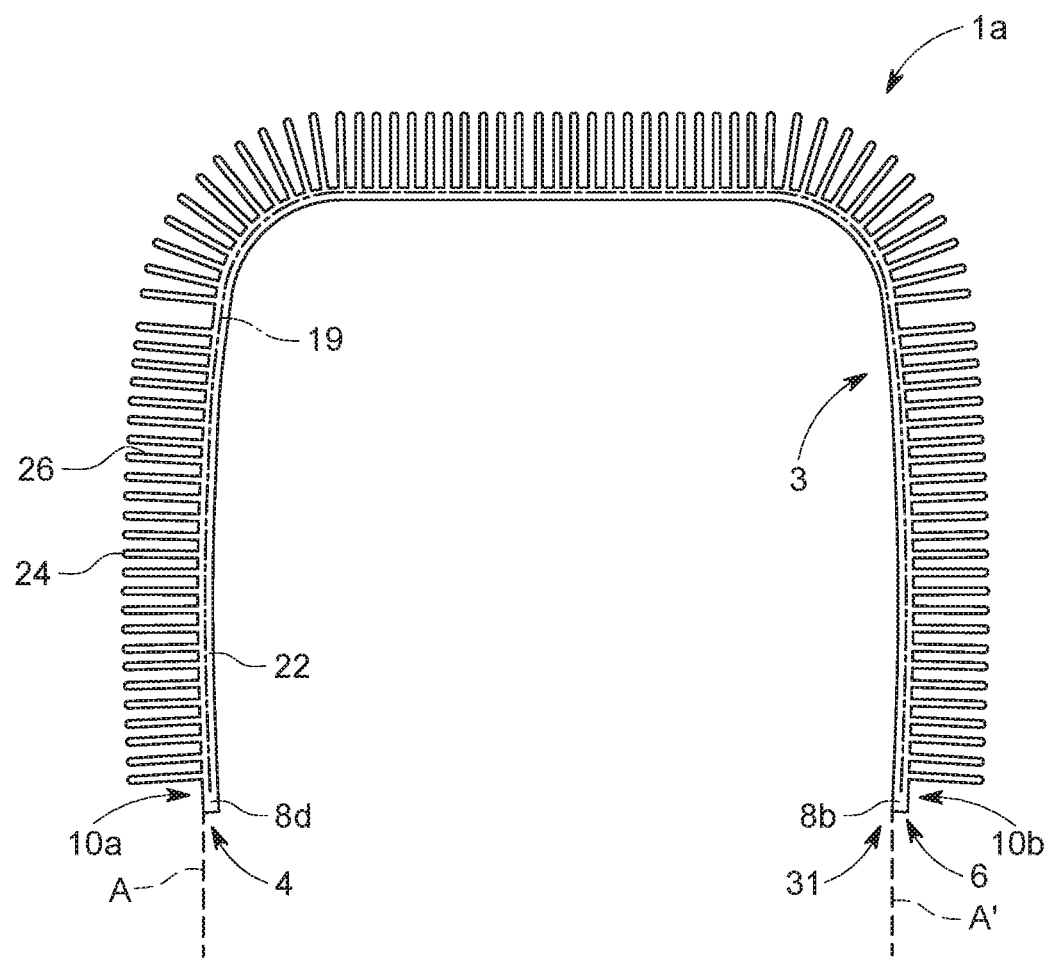
FIG. 3 is a side view of a convective cooling device according to an embodiment of the disclosure.

FIG. 3 is a side view of a convective cooling device 1a according to an embodiment of the disclosure. The convective cooling device 1a shown in FIG. 3 includes the features described above in detail with reference to FIG. 1. In the embodiment shown in FIG. 3, the first 4 and second 6 ends of the elongate strip 3 include the square tip 31. Also, in the embodiment shown in FIG. 3, the second fin end 25 of at least one of the plurality of cooling fins 24 has a rounded, rather than square or rectangular (as shown in FIG. 1) cross-sectional profile, as does the strip 3. Of course, rounded or differently-shaped fins may also be used, for example, where the convective cooling device 1a is frequently contacted by workers (by their hands or other parts of their bodies) in a facility, or where exposure to dirt requires a different fin shape that accumulates less dirt, or when air flow around the fins can be improved with a different shape. In the embodiment shown in FIG. 3, the angle A and the angle A' are both 0°. The convective cooling device 1a assumes a U-shape, as by being bent into the U-shape, by being extruded into the U-shape, by being stamped into the U-shape, and/or by employing other or additional useful forming and shaping operations, including manual bending by an installer, and other techniques as is known for a custom installation. The convective cooling device 1a can also be manufactured as having a U-shape in the first place or to any other suitable shape for the corresponding shape of the housing. The shaping of the convective cooling device is tailored to a corresponding shape of a housing onto which the cooling device is fitted or installed. In general, the shape and/or additional dimensions of the convective cooling device 1a may be predetermined by a user of the device 1a based on dimensions of the particular housing 2 for which the device 1a is to be used. Forming and/or shaping the convective cooling device 1a in this manner may facilitate later installation, assembly, and similar steps as described in further detail herein.

Figure 4:
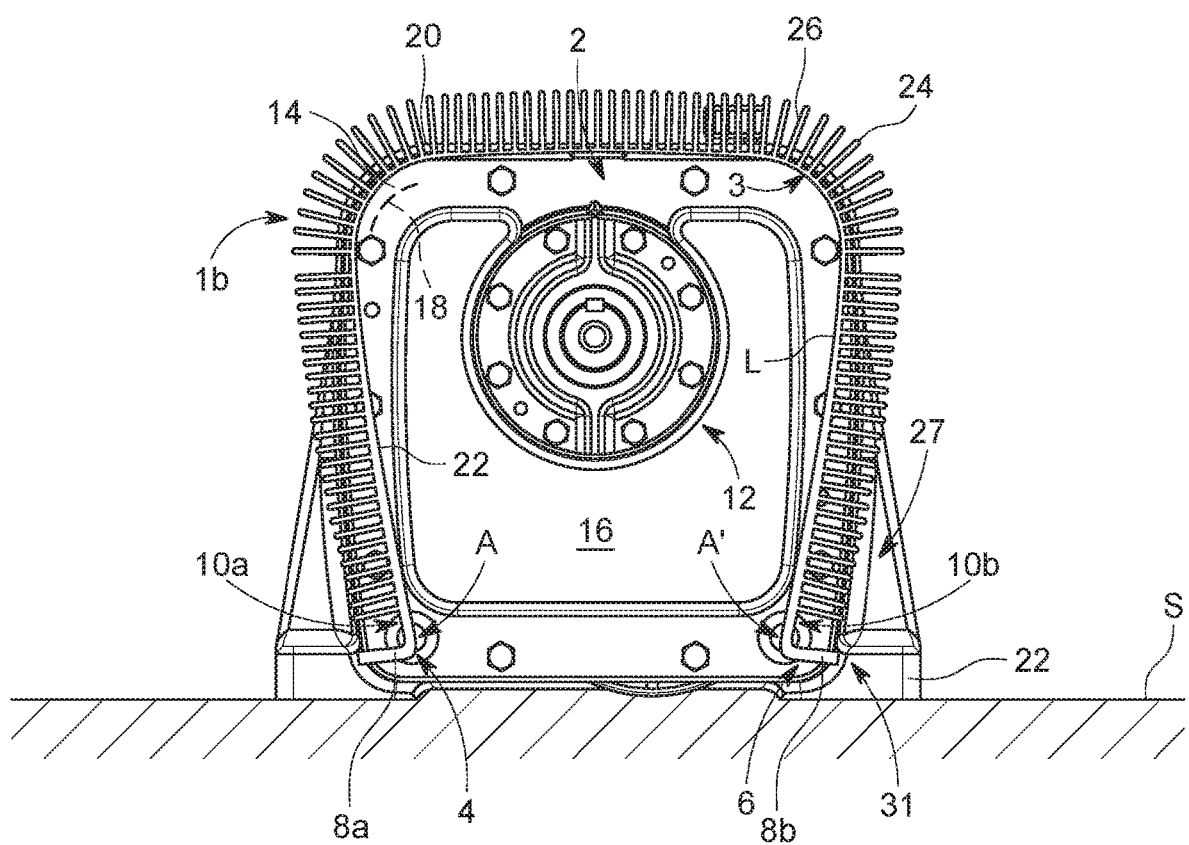
FIG. 4 is a side view of a convective cooling device according to an embodiment of the disclosure superimposed on a side view of an input side of the gearbox housing shown in FIG. 2.
Figure 5:
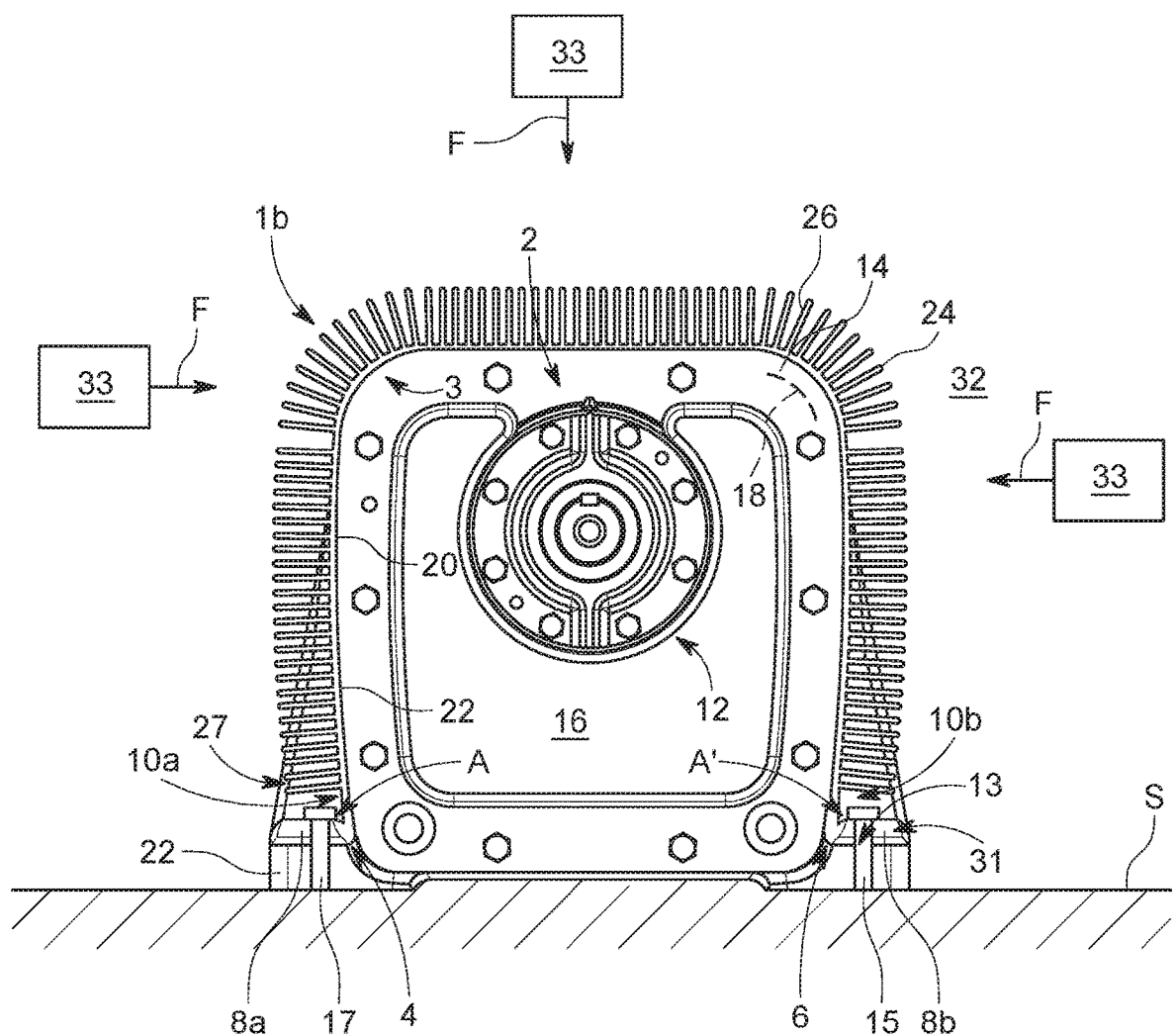
FIG. 5 is a side view of the convective cooling device shown in FIG. 4 attached to the gearbox housing shown in FIG. 2 according to an embodiment of the disclosure.

FIG. 4 is a side view of a convective cooling device 1b according to an embodiment of the disclosure superimposed on a side view of an input side of the gearbox housing 2 shown in FIG. 2 before installation, and FIG. 5 is a side view of the convective cooling device 1b shown in FIG. 4 attached to the gearbox housing 2 shown in FIG. 2 after installation. In the embodiments shown in FIG. 4 and FIG. 5, the convective cooling device 1b assumes a generally U-shape, but with an introduced overbend beyond the U-shape shown in FIG. 4. In the overbent shape, the elongate strip 3 with cooling fins 24 of the convective cooling device 1b is in a relaxed state and has a width between the first 4 and second 6 ends that is less than a width of the housing 2 proximate the base plate 22.

As shown in FIG. 4, the dimensions of the convective cooling device 1b and the values of angle A and angle A' are predetermined based on the dimensions and/or contours of the housing 2 shown in FIGS. 4 and 5. In an embodiment, the first 8a and second 8b tabs of the convective cooling device 1b are bent at substantially equal values of angle A and angle A', respectively, to match, or at least approximate, the values of the angles with which base plate 22 meets the exterior surface 20 of the housing 2. In the embodiment shown in FIGS. 4 and 5, the angle A and the angle A' of the convective cooling device 1b are both acute angles of less than 90°.

As shown in FIG. 5, the convective cooling device 1b may be elastically deformed to open up and fit around the housing 2. In an embodiment, the width between the first 4 and second 6 ends in the relaxed state may be increased to a value that is substantially equal to the width of the housing 2 proximate the base plate 22. Increasing the width between the first 4 and second 6 ends of the device 1b in the relaxed state introduces a spring-like state in the device 1b. In addition to or instead of forming and/or shaping the device 1b to match or at least approximate the dimensions, angles, and contours of the housing 2, this spring-like state introduced by increasing the width between the first 4 and second 6 ends of device 1b may facilitate the device conforming to the contours of the housing 2.

The convective cooling device 1b attached to the housing 2 as shown in FIG. 5 has the lower surface L of the strip 3 positioned on the shell 14 with the base 22 in thermal contact with the exterior surface 20 and conforming to a contour thereof. In an embodiment, the thermal contact of the device 1b body lower surface L of the strip 3 and the conforming of the strip 3 with the contour of the exterior surface 20 of the housing 2 is facilitated by securing at least a portion of the device 1b to at least a portion of the housing 2. In an embodiment, the elongate strip 3 is configured to contact the housing 2 along the lower surface L for conductive heat transfer from the housing 2 to the body (e.g., the base 22). Securing the convective cooling device 1b to the housing 2 after attaching the device 1b to the housing 2 to conform to the contours of the housing 2 facilitates the transfer of heat from the shell 14 of the housing 2 to the base 22 of the elongate strip 3.

As shown in FIG. 5, the first 8a and second 8b tabs are utilized for securing the elongate strip 3 to the housing 2 at each of the first 4 and second 6 ends, respectively. In the present embodiment, the first 8a and second 8b tabs include a tab bore 13 formed therethrough that accommodates a fastener 17. A portion of the housing 2 includes a corresponding threaded bore 15 that threadably engages the fastener 17. In the embodiment shown in FIG. 5, the housing 2 includes a threaded bore 15 on the base plate 22 of the housing 2 positioned on each side thereof. The base plate 22 may function as a gearbox-mounting flange, and the fastener 17 inserted through each pair of tab bores 13 and housing bores 15 may be used to simultaneously fasten the convective cooling device 1b to the housing 2 and the housing 2 to the surface S. As shown, the first 8a and/or the second 8b tabs of the elongate strip 3 may be secured to the housing 2 (e.g., at the base plate 22) using a weld, either instead of or in addition to the fastener 17. Optionally, to improve the securement of the convective cooling device 1b onto the housing 2, additional fastening sites along the elongate strip 3 may be used.

The elongate strip 3 may be made from a compliant material such that the elongate strip 3 conforms to the contours and/or shape of the housing 2 when the first 8a and second 8b tabs are connected to the housing 2 and a majority of the lower surface L contacts the housing 2. The compliant material of construction of the disclosed convective cooling devices may be elastically and/or plastically deformable to facilitate attachment and conforming to the contours and/or shape of the housing 2, as described above with reference to FIGS. 4 and 5. In one embodiment, the material of construction of the plurality of fins 24 and the base 22 of the body of the convective cooling devices described herein are the same, and these structures are unitarily or integrally formed. For example, the convective cooling devices disclosed herein are made of aluminum or an aluminum alloy such as aluminum alloy 6061 with T6 heat treatment, or aluminum alloy from the 1000 class, but other materials may be used, for example, copper or a copper alloy. The material of construction of the disclosed convective cooling devices may be different from the material of construction of the housing 2 (e.g., the material(s) of construction of the shell 14 and/or exterior surface 20 of the housing 2), which may be made from iron or an iron alloy such as ASTM A48 class 30 gray cast iron.

During operation, the convective cooling device 1b attached to the housing 2 receives the generated heat by conduction, for example, from the shell 14 of the housing 2. The heat received into the base 22 flows from the base 22 to the plurality of cooling fins 24 by, for example, conduction. The heat received into the plurality of fins 24 is then transferred to the ambient environment 32 through the fin outer surfaces 26. Heat transfer from the plurality of fins 24 to the ambient environment 32 can occur through radiation, forced convection, free convection, or any combination of those mechanisms. In one contemplated arrangement, one or more air flow systems 33 (three are shown in FIG. 5) such as a fan may be positioned proximate the housing 2 with attached convective cooling device 1b to facilitate heat flow from the plurality of fins 24 to the ambient environment 32 by directing an air flow ("F") onto at least a portion of the plurality of fins 24. As compared to the heat transfer mechanisms shown and described above with reference to FIG. 2, heat transfer rates occurring in the presence of the disclosed convective cooling devices attached to housings 2 are higher, and therefore achieve better cooling effects (e.g., as compared to cast iron housings with cast fins of the material as the housing) for the heat generating equipment 12 in the housing 2 during and/or after its operation.

Figure 6:
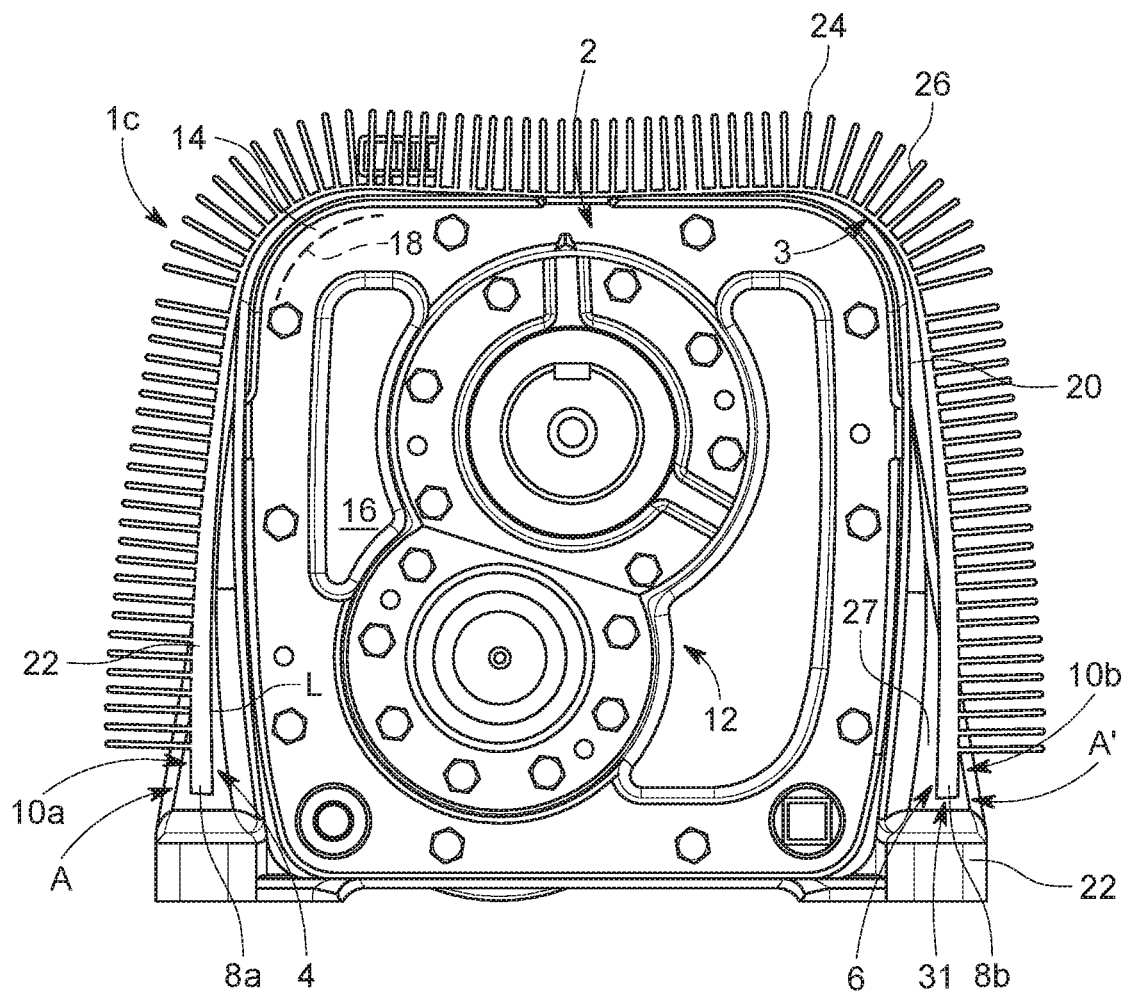
FIG. 6 is a side view of a convective cooling device according to an embodiment of the disclosure superimposed on a side view of the output side of the gearbox housing shown in FIG. 2.
Figure 7:
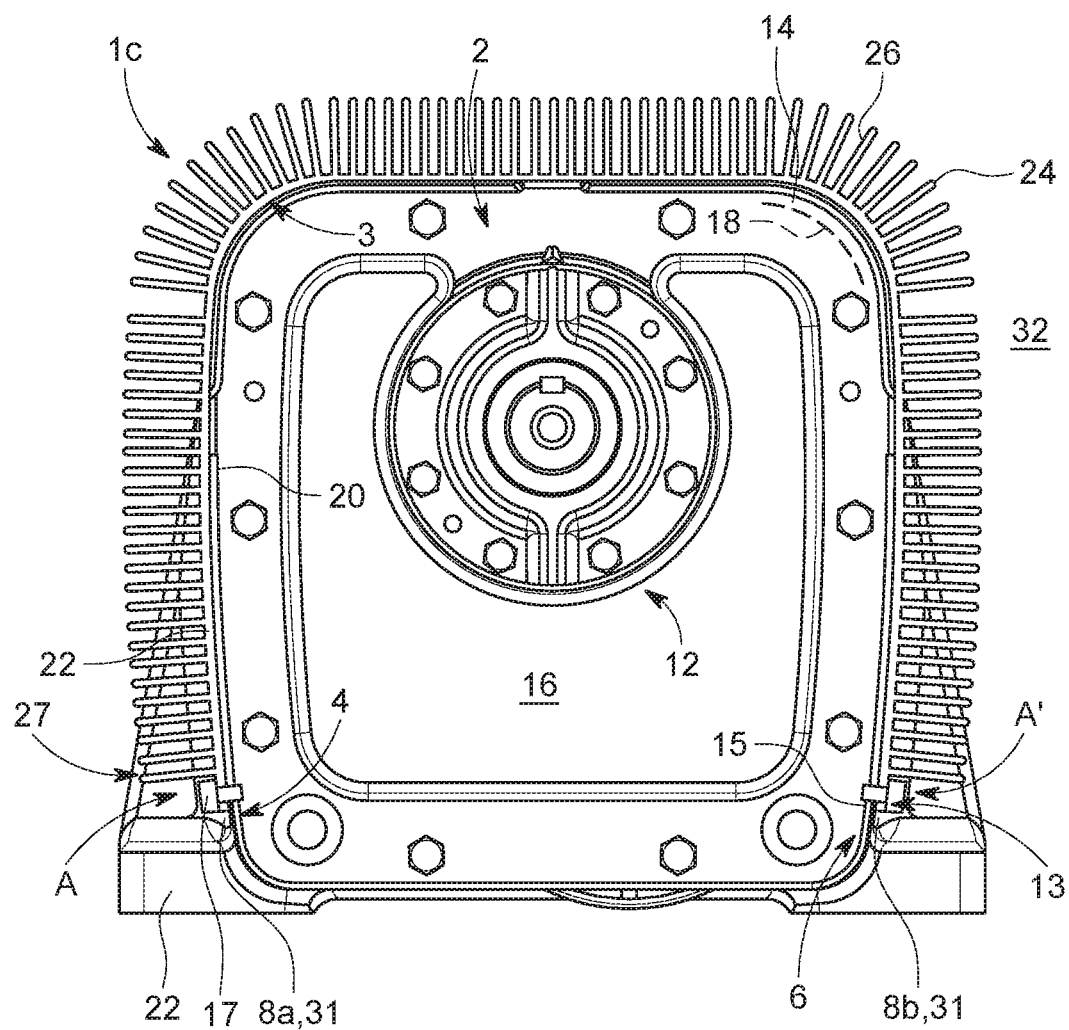
FIG. 7 is a side view of the convective cooling device shown in FIG. 6 attached to the gearbox housing shown in FIG. 2 according to an embodiment of the disclosure.

FIG. 6 is a side view of a convective cooling device 1c according to an embodiment of the disclosure superimposed on a side view of the output side of the gearbox housing 2 shown in FIG. 2. FIG. 7 is a side view of the convective cooling device 1c shown in FIG. 6 attached to the gearbox housing 2 shown in FIG. 2 according to an embodiment of the disclosure. In the embodiments shown in FIG. 6 and FIG. 7, the convective cooling device 1c assumes a generally U-shape, but with an underbend which increases the width between the first 4 and second 6 ends as compared to the convective cooling device 1b shown in FIG. 4. In the underbent shape, the elongate strip 3 with cooling fins 24 of the convective cooling device 1c is in a relaxed state and has a width between the first 4 and second 6 ends that is greater than a width of the housing 2 proximate the base plate 22.

As shown in FIG. 6, the dimensions of the convective cooling device 1c and the values of angle A and angle A' are predetermined based on the dimensions and/or contours of the housing 2 shown in FIGS. 6 and 7. In an embodiment, the first 8a and second 8b tabs of the convective cooling device 1b are not bent relative to the adjacent planes (10a, 10b) and thus the tabs (8a, 8b) have values of angle A and angle A', respectively, equal to or approximately 0°.

As shown in FIG. 7, the convective cooling device 1c in its relaxed state may be fit onto the housing 2 without being elastically deformed. The width between the first 4 and second 6 ends in the relaxed state may be decreased to a value that is at least approximately equal to the width of the housing 2 proximate the base plate 22. Decreasing the width between the first 4 and second 6 ends of the device 1b in the relaxed state introduces a spring-like state in the device 1c. In addition to or instead of forming and/or shaping the device 1c to match or at least approximate the dimensions, angles, and contours of the housing 2, this spring-like state introduced by decreasing the width between the first 4 and second 6 ends of device 1c may facilitate the device conforming to the contours of the housing 2 by wrapping the elongate strip 3 around the outer surface of the housing 2.

The convective cooling device 1c attached to the housing 2 as shown in FIG. 7 has portions of the lower surface L of the elongate strip 3 positioned on the shell 14 with the base 22 in thermal contact with the exterior surface 20 and conforming to a contour thereof. The thermal contact of the device 1c body lower surface L of the strip 3 and the conforming of the strip 3 with the contour of the exterior surface 20 of the housing 2 is facilitated by securing at least a portion of the device 1c to at least a portion of the housing 2. The elongate strip 3 is configured to contact the housing 2 along the lower surface L for conductive heat transfer from the housing 2 to the body (e.g., the base 22). Securing the convective cooling device 1c to the housing 2 after attaching the device 1c to the housing 2 to conform to the contours of the housing 2 facilitates the transfer of heat from the shell 14 of the housing 2 to the base 22 of the elongate strip 3. Securing the device 1c to the housing in this manner may include elastically deforming the device 1d from its relaxed state to facilitate the thermal contact between the lower surface L of the elongate strip 3 and the exterior surface 20 of the housing 2.

As shown in FIG. 7, the first 8a and second 8b tabs are utilized for securing the elongate strip 3 to the housing 2 at each of the first 4 and second 6 ends, respectively. In the present embodiment, the first 8a and second 8b tabs include the tab bore 13 formed therethrough to accommodate a fastener 17. The housing 2 includes corresponding threaded bores 15 to threadably engage the fasteners 17. In the embodiment shown in FIG. 7, the housing 2 includes the housing bore 15 bored into, but not through, the shell 14 of the housing 2. In another embodiment, not shown, the housing bore 15 is bored through the shell 14 of the housing 2 on each side thereof and proximate the first 8a and second 8b ends. The first 8a and/or the second 8b tabs of the elongate strip 3 may be secured to the housing 2 using a weld, either instead of or in addition to the fasteners 17, and additional fasteners or other fastening methods may be used at other locations to secure the elongate strip 3 to the housing 2.

Figure 8:
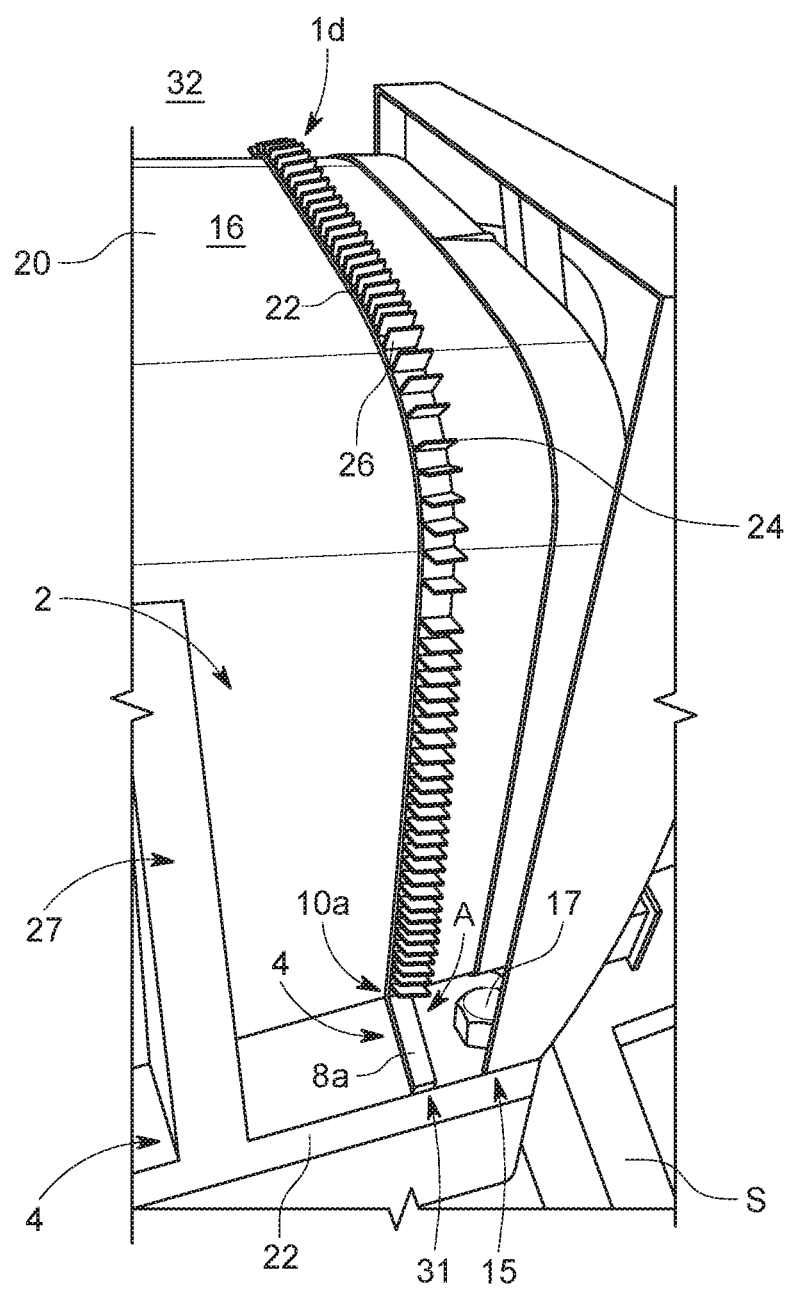
FIG. 8 is a perspective view of a convective cooling device attached to a gearbox housing according to an embodiment of the disclosure.

FIG. 8 is a perspective view of a convective cooling device 1d attached to a gearbox housing 2 according to an embodiment of the disclosure. The convective cooling device 1d shown in FIG. 8 is attached to the housing 2 and conforms to the contours, angles, and/or shape of the housing 2, as described in detail above with respect to FIGS. 4 and 5. As shown in FIG. 8, the housing may include a frame rib 27 extending radially outward from the shell 14 of the housing 2. The rib 27 may provide structural support for the housing 2 as, for example, to prevent or at least mitigate excessive vibration during operation of gears and/or other rotating machinery inside housing 2. In the present embodiment, the first 8a and/or the second 8b tabs are formed at, or at approximately right angles A and A' relative to their respective adjacent planes 10a and 10b (only the first tab 8a is shown in FIG. 8). The right angle A of the first tab 8a matches or at least approximates the angle with which base plate 22 meets the exterior surface 20 of the housing 2. In operation, the convective cooling device 1d effectuates cooling of the heat generating equipment 12 inside the housing 2 by the same heat transfer mechanisms described in detail above with respect to FIG. 5.

Figure 9:
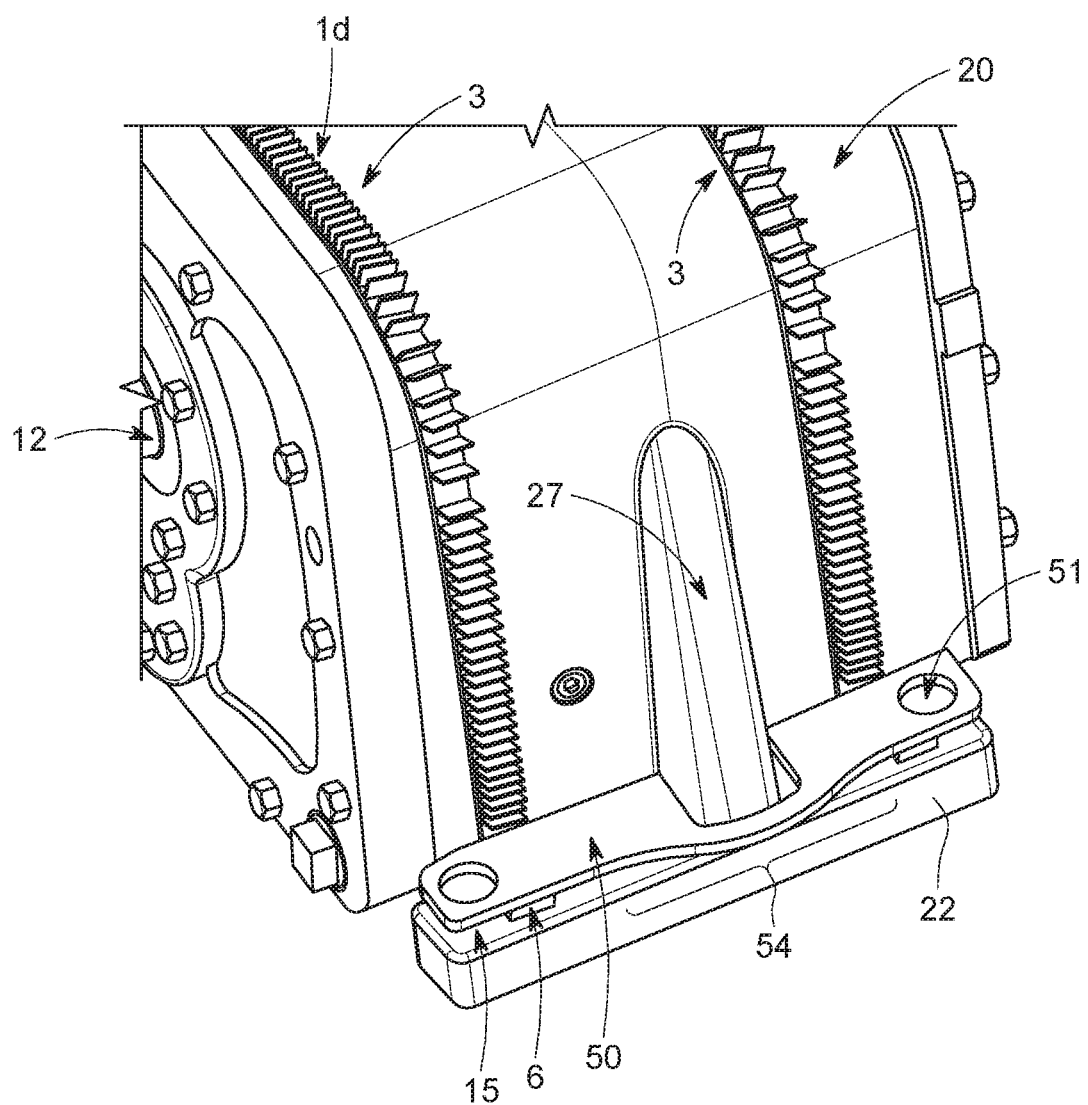
FIG. 9 is a perspective view of the convective cooling device shown in FIG. 8 attached to the gearbox housing shown in FIG. 8 according to an embodiment of the disclosure.

FIG. 9 is a perspective view of the convective cooling device 1d shown in FIG. 8 attached to the gearbox housing 2 shown in FIG. 7 according to an embodiment of the disclosure. In the embodiment shown in FIG. 9, two convective cooling devices 1d are attached to the housing 2. In other embodiments, not shown, three or more of the disclosed convective cooling devices may be attached to a single housing 2. It is also contemplated that substantially an entire outer surface of the housing may be covered by cooling devices disposed immediately adjacent to one another, or at a regular spacing. Attaching a plurality of the disclosed convective cooling devices to one housing 2 may increase the speed and/or efficiency of heat transfer and thus improve cooling of the heat generating equipment 12 according to the disclosed devices and methods (e.g., as compared to attaching just one convective cooling device).

The convective cooling device 1d attached to the housing 2 as shown in FIG. 8 has the lower surface L of the strip 3 positioned on the shell 14 with the base 22 in thermal contact with the exterior surface 20 and conforming to a contour thereof. The thermal contact of the device 1d body lower surface L of the strip 3 and the conforming of the strip 3 with the contour of the exterior surface 20 of the housing 2 is facilitated by securing at least a portion of the device 1d to at least a portion of the housing 2. The elongate strip 3 is configured to contact the housing 2 along the lower surface L for conductive heat transfer from the housing 2 to the body (e.g., the base 22). Securing the convective cooling device 1d to the housing 2 after attaching the device 1d to the housing 2 to conform to the contours of the housing 2 facilitates the transfer of heat from the shell 14 of the housing 2 to the base 22 of the elongate strip 3.

As shown in FIGS. 8 and 9, the first 8a and second 8b tabs are utilized for securing the elongate strip 3 to the housing 2 at each of the first 4 and second 6 ends, respectively. In the present embodiment, the first 8a and second 8b tabs need not include the tab bore 13 formed therethrough. A portion of the housing 2 includes the housing bore 15 to insert the fastener 17 through. In the embodiment shown in FIGS. 8 and 9, the housing 2 includes the housing bores 15 on the base plate 22 of the housing 2 positioned on each side thereof.

In the present embodiment, the first 8a and/or second 8b tabs of the convective cooling devices 1d are secured to the housing 2 at its base plate 22 by using clamping plates 50. The clamping plate 50 may be used for clamping the first 8a and/or second 8b tabs of the strip 3 to the housing 2. As shown in FIG. 9, the clamping plate 50 is formed and/or shaped to match or at least approximate a shape of the housing 2, rib 27, and/or base plate 22. The clamping plate 50 includes plate bores 51 whose positions corresponds to the positions of the housing bores 15. In the present embodiment, the clamping plate includes a thin section 54, which accommodates the protrusion of the rib 27 onto the plane of the base plate 22. The thin section 54 may be reinforced as, for example, by forming and/or shaping the clamp plate 50 to be thicker at and near the thin section 54 as compared to those portions of the clamp plate 50 near the plate bores 51 and near the ends of the clamp plate 50.

In the present embodiment, the base plate 22 may function as a gearbox-mounting flange, and the fastener 17 inserted through each pair of plate 51 and housing 15 bores may be used to simultaneously fasten the clamping plate 50 and device 1d to the housing 2 and the housing 2 to the surface S. Using the clamping plate 50 in the manner described above clamps the tabs (8a, 8b) of the elongate strip 3 between the exterior surface 20 of the housing 2 and the clamping plate 50, thereby securing the device 1d to the housing 2. The first 8a and/or the second 8b tabs of the elongate strip 3 may be secured to the housing 2 (e.g., at the base plate 22) using a weld, either instead of or in addition to using the fastener 17 and/or clamp plate 50. At least a portion of the elongate strip 3 is secured to at least a portion of the housing 2 at strip 3 portions other than or addition to at the first 8a and/or second 8b tabs. In another embodiment, not shown, other portion(s) of the elongate strip 3 instead of or in addition to the tabs (8a, 8b) may be secured to the housing 2 by clamping them thereto using the clamping plate 50. In yet another embodiment, not shown, the clamping of the tabs (8a, 8b) and/or other portion(s) of the strip 3 is accomplished by welding the clamping plate 50 to the housing 2 either instead of or in addition to otherwise securing the clamping plate 50 to the housing 2.

Figure 10A:
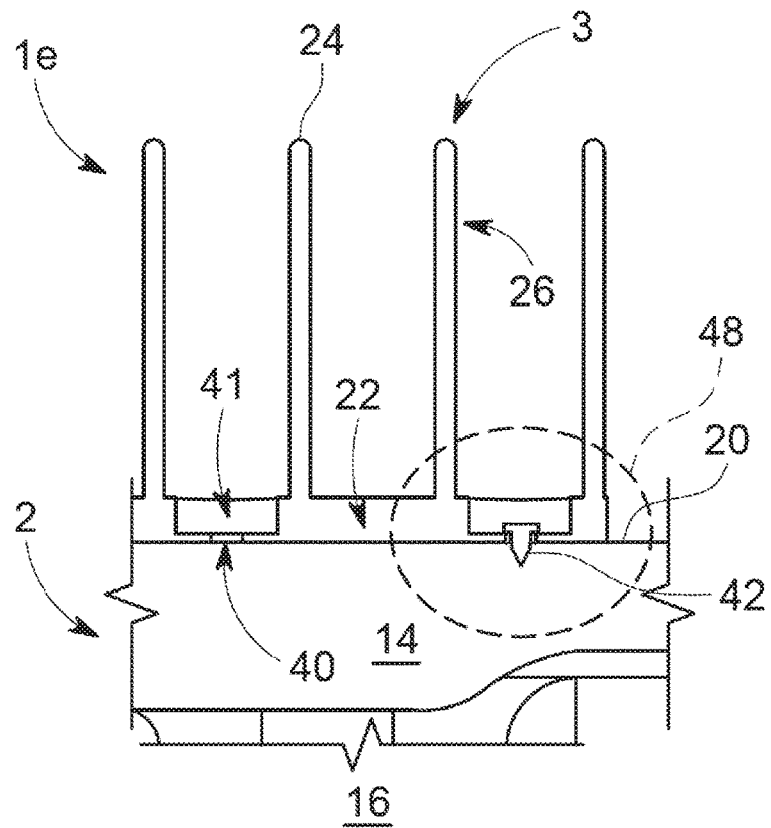
FIG. 10A is a cross sectional view of a convective cooling device attached to a gearbox housing according to an embodiment of the disclosure.
Figure 10B:
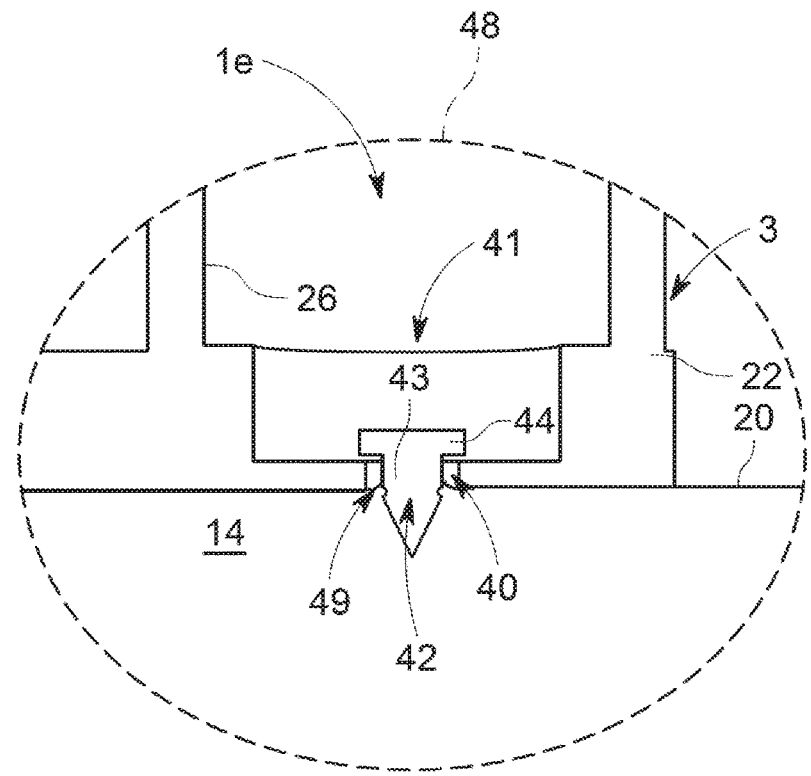
FIG. 10B is a magnified cross sectional view of the convective cooling device shown in FIG. 10A attached to the gearbox housing shown in FIG. 10A according to an embodiment of the disclosure.

FIG. 10A is a cross sectional view of a convective cooling device 1e attached to a gearbox housing 2 according to an embodiment of the disclosure. FIG. 10B is a magnified cross sectional view of the convective cooling device 1e shown in FIG. 10A attached to the gearbox housing 2 shown in FIG. 10A according to an embodiment of the disclosure. In the present embodiment, one or more base bores 40 are formed through the base 22 of the convective cooling device 1e body between one or more pairs of adjacent cooling fins 24. The base bores 40 may include a counter bore 41 formed coaxially with the base bore 40. A penetrating fastener 42 may be driven into the shell 14 of the housing 2 through the base bore 40 to secure the elongate strip 3 of the convective cooling device 1e to the housing 2. Non-limiting examples of penetrating fasteners 42 include GRIPNAIL® MetalTack, PunchPin, and DriveTack.

In an embodiment, a diameter of the base bore 40 is greater than a diameter of a shaft 43 of the penetrating fastener 42, but is less than a head 44 of the penetrating fastener 42. This dimensional arrangement off the base bore 40 and the penetrating fastener 42 enables metal burrs 49 to form upon forcefully driving (e.g., using a pneumatic nailing tool) the penetrating fastener 42 into the housing 2. The metal burrs 49 engage portions of the shaft 43 to facilitate a strong and long-lasting "bite" for securing the device 1e to the housing 2. In another embodiment, not shown, the penetrating fastener 42 and the dimension arrangements of the base bore 40 and the penetrating fastener 42 may be employed for securing the tabs (8a, 8b) to the housing 2 using, for example, counterbored tab bores 13. Use of the penetrating fasteners 42 for securing the disclosed convective cooling devices to the housing 2 is advantageous in certain applications of the disclosed devices and systems because it does not require positioning, predrilling and/or threading holes into the housing 2.

Figure 11A:
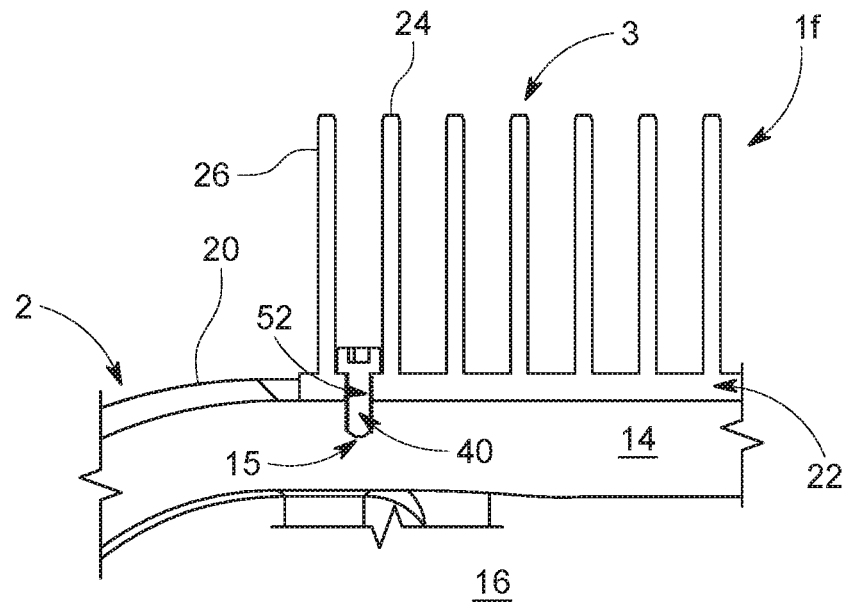
FIG. 11A is a cross sectional view of a convective cooling device attached to a gearbox housing according to an embodiment of the disclosure.
Figure 11B:
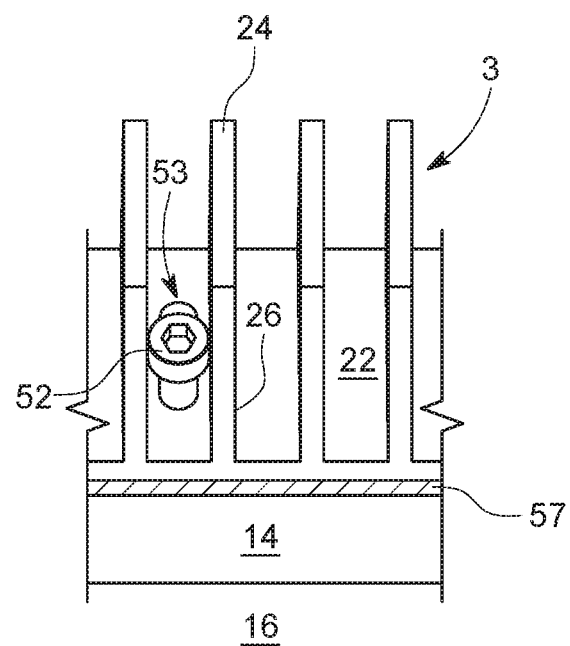
FIG. 11B is a perspective and partial cross sectional view of the convective cooling device shown in FIG. 11A attached to the gearbox housing shown in FIG. 11A according to an embodiment of the disclosure.

FIG. 11A is a cross sectional view of a convective cooling device if attached to a gearbox housing 2 according to an embodiment of the disclosure. FIG. 11B is a perspective and partial cross sectional view of the convective cooling device if shown in FIG. 11A attached to the gearbox housing 2 shown in FIG. 11A according to an embodiment of the disclosure. In the present embodiment, one or more base bores 40 are formed through the base 22 of the convective cooling device if body between one or more pairs of adjacent cooling fins 24. The correspondingly coaxial housing bore 15 is threaded. As shown in FIG. 11B, the base bore 40 may be formed as a slotted hole. A threaded screw or bolt 52 may be inserted through the base bore 40 and into the housing bore 15 to secure the elongate strip 3 of the convective cooling device if to the housing 2. In another embodiment, not shown, the threaded screw or bolt 52 may be employed for securing the tabs (8a, 8b) to the housing 2 using, for example, the tab bores 13 with correspondingly coaxial and threaded housing bores 15.

Also, as shown in FIG. 11B, a layer of thermal transfer compound 57 may be applied to the lower surface L of the base 22 of the elongate strip 3 prior to attaching and/or securing the disclosed convective cooling devices to the housing 2. To facilitate heat transfer from the housing 2 through the shell 14 and to the base 22 of the strip 3, embodiments of the disclosed convective cooling devices may include thermal transfer compound 57 in contact with the base 22 of the strip 3 in contact with the exterior surface 20 of the housing 2. In another embodiment, not shown, the thermal transfer compound 57 includes an adhesive to facilitate securing the disclosed convective cooling devices to the housing 2. To facilitate securing the disclosed convective cooling devices to the housing 2, embodiments of the disclosed convective cooling devices may include an adhesive, not shown, in contact with the base 22 of the strip 3 in contact with the exterior surface 20 of the housing 2, and either instead of or in addition to using the thermal transfer compound 57.

Figure 12:
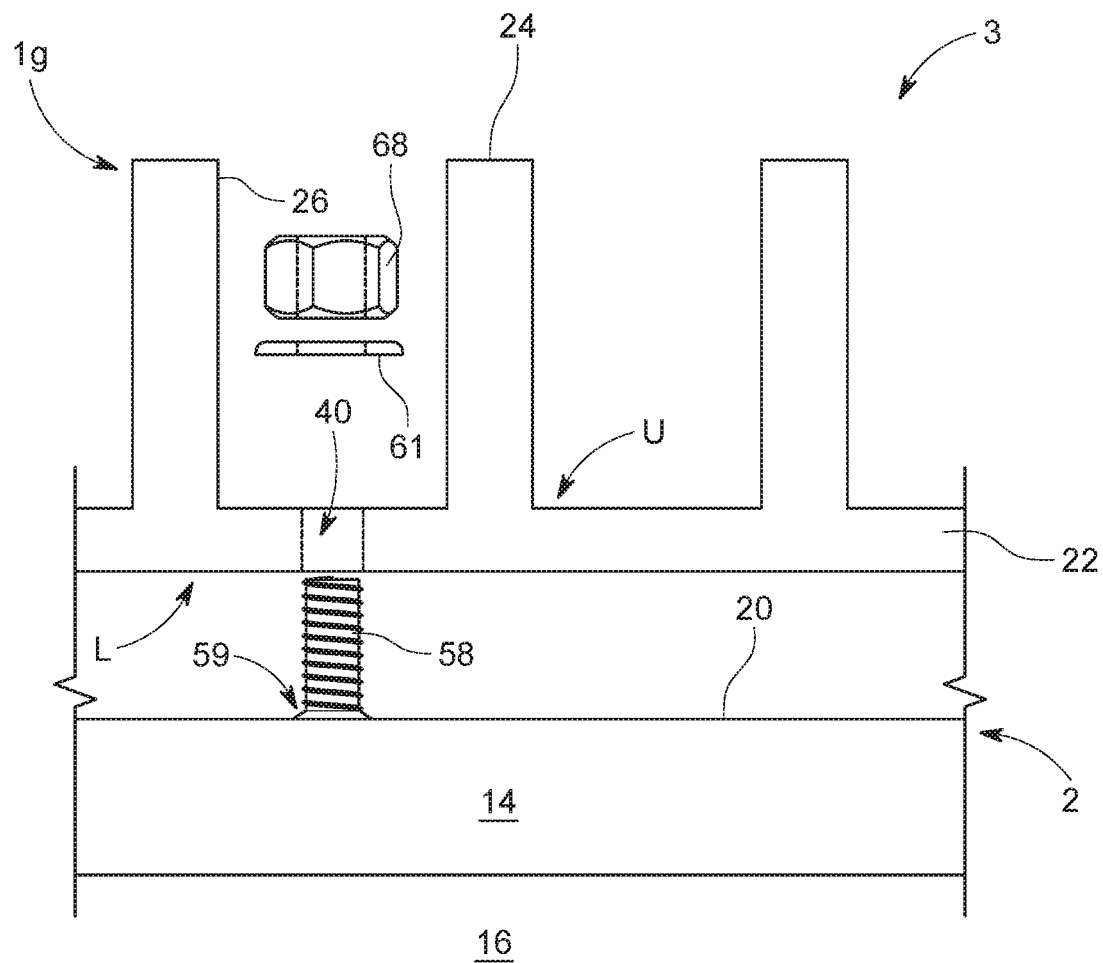
FIG. 12 is a side and partial cross sectional view of a convective cooling device attached to a gearbox housing according to an embodiment of the disclosure.

FIG. 12 is a side and partial cross sectional view of a convective cooling device 1g attached to a gearbox housing 2 according to an embodiment of the disclosure. The convective cooling device 1g may include the base bore(s) 40, as described above with reference to FIGS. 11A and 11B. The housing 2 may include a threaded mounting stud 58 coupled to the housing 2 at the exterior surface 20 thereof via a weld 59. The material of construction of the housing 2 shell 14 is the same as the material of construction of the mounting stud 58. In another embodiment, the stud 58 and the shell 14 of the housing 2 are constructed of different materials. Mounting studs 58 can be welded to the housing 2 using a stud welder based on arc welding or friction welding (e.g., RAMSTUD® Friction Welding System). Both welding methods can join similar or dissimilar metals. Friction welding can be done through layer(s) of paint on the exterior surface 20 of the housing 2.

In the present embodiment, one or more base bores 40 are formed through the base 22 of the convective cooling device 1g body between one or more pairs of adjacent cooling fins 24. The base bore 40 may be formed as a slotted hole, as shown in FIG. 11B. The threaded mounting stud 58 may be inserted through the base bore 40 and the device 1g may be secured to the housing 2 by threading and tightening a nut 68 onto the threaded mounting stud 58. In the illustrated embodiment, a washer 61 is placed on the mounting stud 58 to contact the upper surface U of the strip 3 and the nut 68. In another embodiment, not shown, a washer 61 is placed on the mounting stud 58 to contact the lower surface L of the strip 3 and the exterior surface 20 of the housing 2, either instead of or in addition to the aforementioned washer 61 arrangement. In yet another embodiment, not shown, the threaded mounting stud 58 may be employed for securing the tabs (8a, 8b) to the housing 2 using, for example, the tab bores 13 with correspondingly coaxial and threaded mounting studs 58.

The disclosed convective cooling devices may be secured to the housing 2 using any combination of the components and methods described herein. For example, the first 8a and/or the second 8b tab may be secured to the housing 2 using a fastener 17, the mounting stud 58, and/or a weld.

Figure 13:
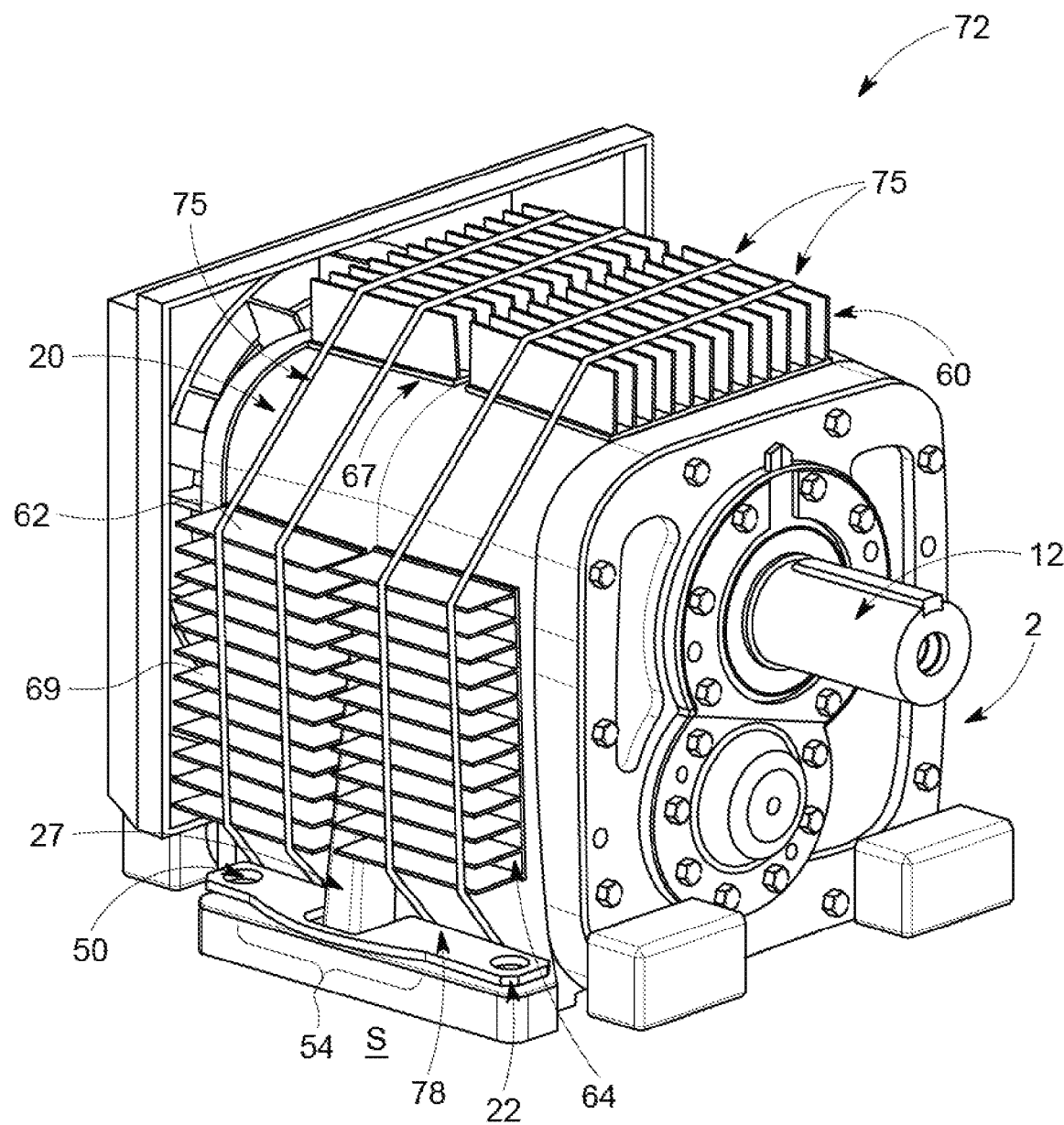
FIG. 13 is a perspective view of a heat sink attached to the gearbox housing shown in FIG. 8 and FIG. 9 according to an embodiment of the disclosure.

FIG. 13 is a perspective view of a convective cooling arrangement 72 for the gearbox housing 2 shown in FIG. 8 and FIG. 9 according to an embodiment of the disclosure. The convective cooling arrangement 72 includes one or more heat sinks 60. Each of the one or more heat sinks 60 includes a generally flat body 62 having a plate shape. The body 62 includes upper 64 and lower 67 surfaces. The body 62 of each of the one or more heat sinks 60 is connected to the exterior surface 20 of the housing 2 and configured to conductively absorb heat from the housing 2. A plurality of cooling fins 69 are attached along the upper surface 64. Each of the plurality of elongate cooling fins 69 are connected to the upper surface 64 of the body 62 at one fin end, and extends away from the upper surface 64 of the body 62 at another, free fin end. The free fin ends of at least some of the plurality of cooling fins 69 can take on any appropriate shape.

The convective cooling arrangement 72 includes at least one fastener 75 disposed to fasten at least one of the one or more heat sinks 60 to the housing 2. In the embodiment shown in FIG. 13, the fastener 75 is a hoop clamp strip fastener 75. In the present embodiment, the one or more heat sinks 60 include fin extrusions positioned on the shell 14 of the housing 2 in thermal contact with the exterior surface 20 and clamped thereto by the hoop clamp strip fastener 75 with its end 78 clamped to the housing 2 by clamping plates 50, substantially as shown and described above with reference to clamping tabs (8a, 8b) to the housing using clamping plate 50.

Figure 14A:
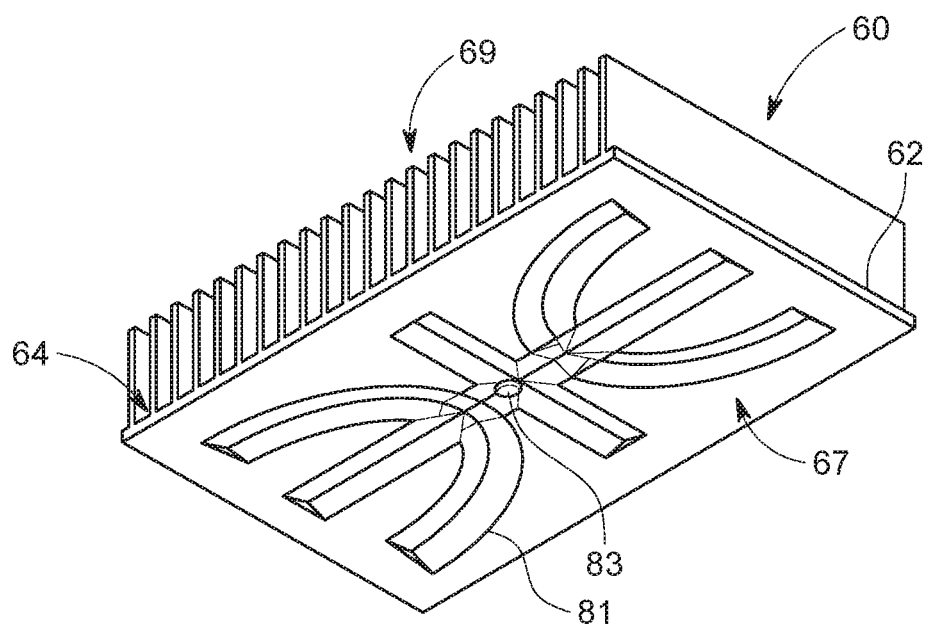
FIG. 14A is a perspective view of a heat sink showing a bottom surface thereof according to an embodiment of the disclosure.
Figure 14B:
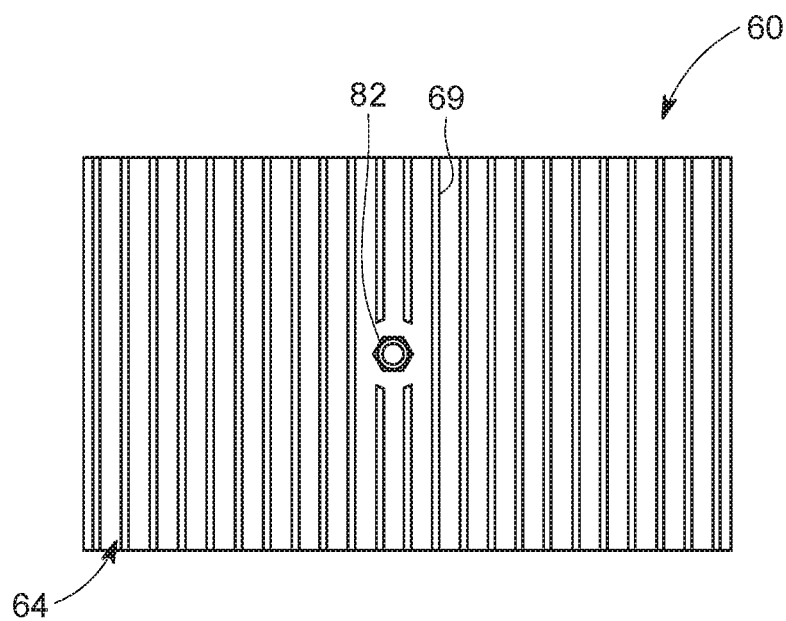
FIG. 14B is a top view of the heat sink shown in FIG. 14A.

FIG. 14A is a perspective view of a heat sink 60 showing a lower surface 67 thereof according to an embodiment of the disclosure. FIG. 14B is a top view of the heat sink 60 shown in FIG. 14A. The heat sink 60 shown in FIGS. 14A and 14B includes the features described above with reference to FIG. 13. Additionally, in the present embodiment, the heat sink 60 includes channels 81 for distribution of thermal transfer compound 57 in the base 62 of the heat sink 60 (e.g., a base 62 of the heat sink 60 body). As shown in FIG. 14A, the channels 81 are formed in the lower surface 67 of the base 62. In the present embodiment, the channels 81 have a through- and/or V-shaped cross section.

The heat sink 60 may include a grease fitting 82. The grease fitting 82 may include a ball check valve. In the present embodiment, the grease fitting 82 extends from the upper surface 64 of the heat sink 60 through the base 62 to an outlet 83 in fluid communication with the grease fitting 82 and positioned on the lower surface 67 of the base 62. In the present embodiment, the grease fitting 82 is positioned at least approximately at a center of the heat sink 60 upper surface 64 and the outlet 83 is positioned at least approximately at a center of the heat sink 60 lower surface 67. In another embodiment, not shown, the grease fitting 82 and/or the outlet 83 is positioned at a location other than the center of the upper 64 and/or lower 67 surfaces. In yet another embodiment, not shown, the heat sink 60 may include a plurality of grease fittings 82 and/or a plurality of outlets 83. Collectively, the channels 81, the one or more grease fittings 82, and the one or more outlets 83 form a channel set.

In an embodiment, thermal transfer compound 57 may be flowed into the grease fitting 82 after the heat sink 60 has been attached and/or secured to the housing 2 as, for example, described above with reference to FIG. 13. By flowing the thermal transfer compound 57 under pressure through the grease fitting 82, the thermal transfer compound 57 will subsequently flow into the channels 81, thereby forming a layer of thermal compound 57 between the lower surface 67 of the heat sink 60 and the exterior surface 20 of the housing 2 as, for example, described above with reference to FIG. 11B. Upon cessation of flowing the thermal transfer compound 57 under pressure through the grease fitting 82, the ball check valve closes to keep out dirt and other contaminants from the layer of thermal transfer compound 57. The present embodiment of the heat sink 60 is advantageous for use in the cooling arrangement 72 shown in FIG. 13. For example, the flowing of the thermal transfer compound 57 through the grease fitting 82 eliminates, or at least reduces, the occurrence of air pockets between the lower surface 67 of the heat sink 60 base 62 and the exterior surface 20 of the housing 2. Additionally, the present embodiment of the heat sink 60 is advantageous for cooling arrangement 72 because the thermal transfer compound 57 may be renewed from time to time it dries out.

In another embodiment, not shown, the disclosed convective cooling devices may include one or more channel sets. For example, and without limitation, the convective cooling device 1 shown in FIG. 1 may include the channels 81 formed in the lower surface L of the base 22. The convective cooling device 1 may include the grease fitting 82 extending from the upper surface U of the strip 3 base 22 to an outlet 83 in fluid communication with the grease fitting 82 and positioned on the lower surface L of the base 22. In such embodiments of the disclosed convective cooling devices, including the one or more channel sets is advantageous for use in cooling housings 2. For example, the flowing of the thermal transfer compound 57 through the grease fitting 82 eliminates, or at least reduces, the occurrence of air pockets between the lower surface L of the strip 3 base 22 and the exterior surface 20 of the housing 2. Additionally, including channel set(s) in the disclosed convective cooling devices is advantageous for use in cooling housings 2 because the thermal transfer compound 57 may be renewed from time to time it dries out.

Figure 15:
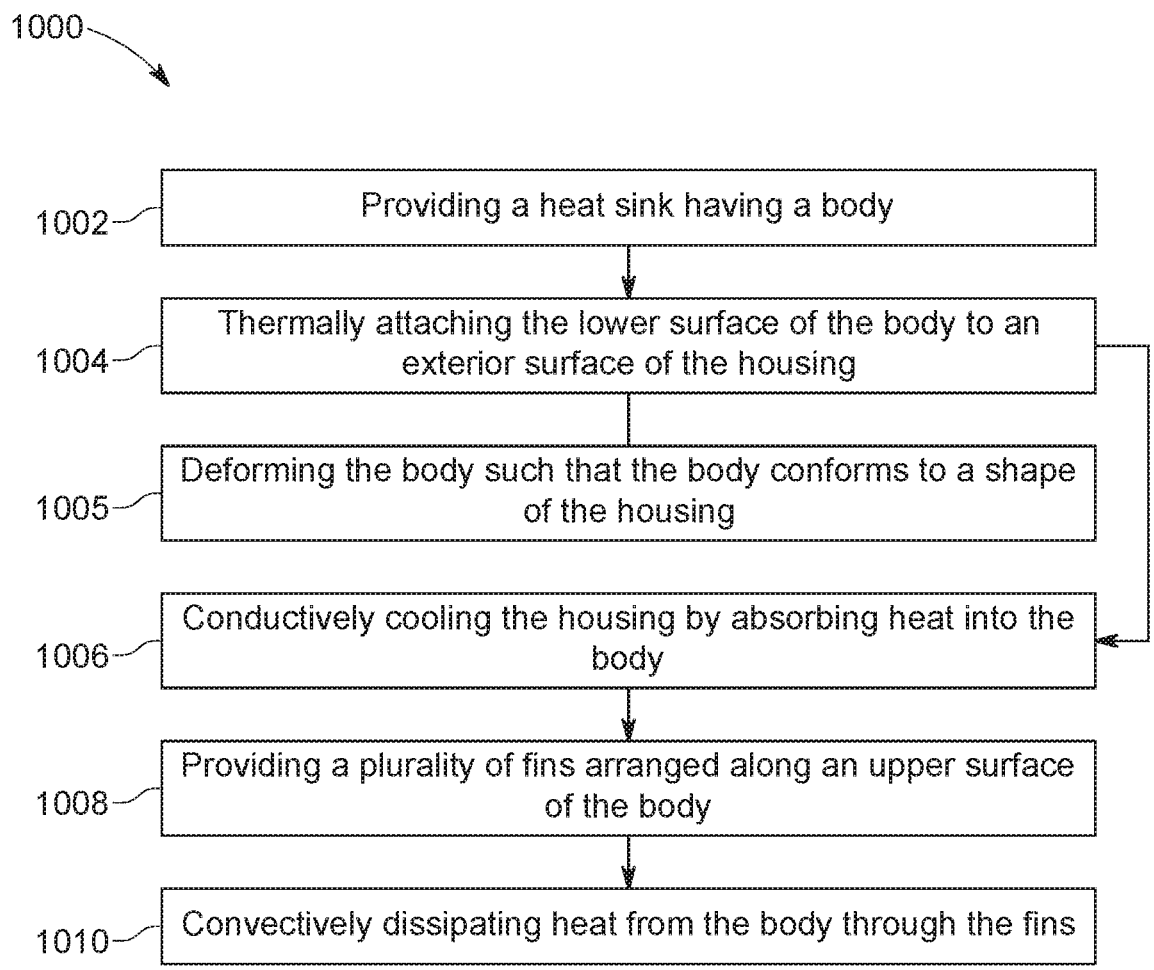
FIG. 15 is a flowchart of a method for cooling a housing according to an embodiment of the disclosure.

FIG. 15 is a flowchart of a method 1000 for cooling a housing 2 according to an embodiment of the disclosure. The method 1000 includes providing 1002 a heat sink (e.g., convective cooling device 1 and/or heat sink 60) having a body, the body including upper and lower surfaces. The method 1000 further includes thermally attaching 1004 the lower surface of the body to an exterior surface of the housing 2, where thermally attaching 1004 the body to the housing 2 includes deforming 1005 the body such that the body conforms to a shape of the housing 2. The method 1000 includes conductively cooling 1006 the housing 2 by absorbing heat into the body, and providing 1008 a plurality of fins arranged along the upper surface of the body, each of the plurality of elongate fins being connected to the upper surface of the elongate strip at one end, and extending away from the upper surface of the elongate strip at another, free end. The method 1000 also includes convectively dissipating 1010 heat from the body through the fins.

Figure 16:
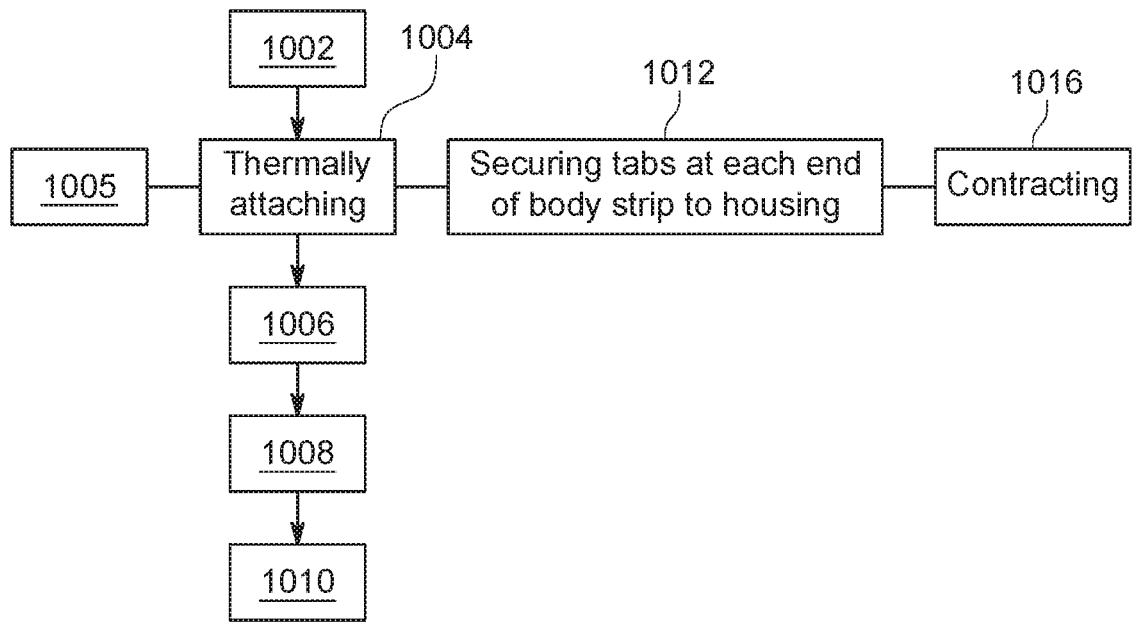
FIG. 16 is a flowchart of an aspect of the thermally attaching step of the method shown in FIG. 15 according to an embodiment of the disclosure.

FIG. 16 is a flowchart of an aspect of the thermally attaching step 1004 of the method 1000 shown in FIG. 15 according to an embodiment of the disclosure. In the present embodiment, thermally attaching at 1004 includes securing 1012 the heat sink to the housing 2, which includes securing tabs at each end of the body to the housing 2.

Figure 17:
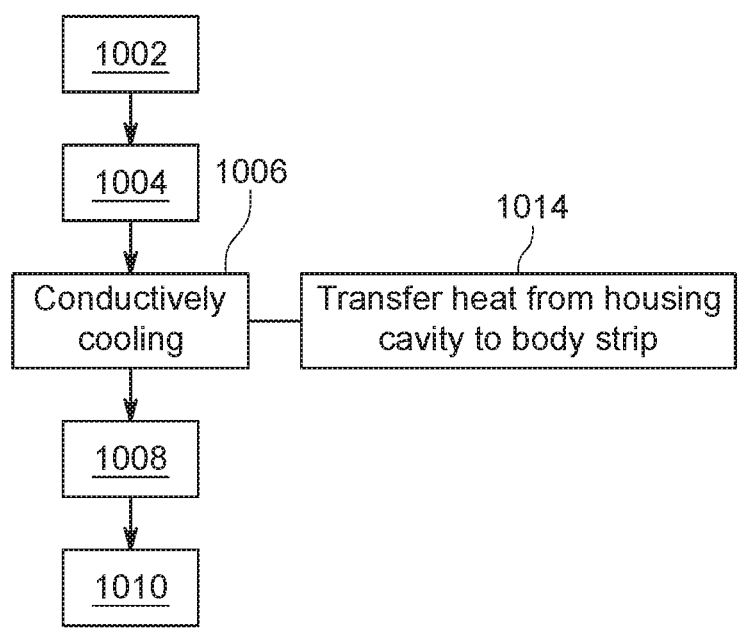
FIG. 17 is a flowchart of an aspect of the conductively cooling step of the method shown in FIG. 15 according to an embodiment of the disclosure.

FIG. 17 is a flowchart of an aspect of the conductively cooling step 1006 of the method 1000 shown in FIG. 15 according to an embodiment of the disclosure. In the present embodiment, the conductively cooling step 1006 includes transferring 1014 heat from a cavity 16 of the housing 2 to the heat sink body.

Figure 18:
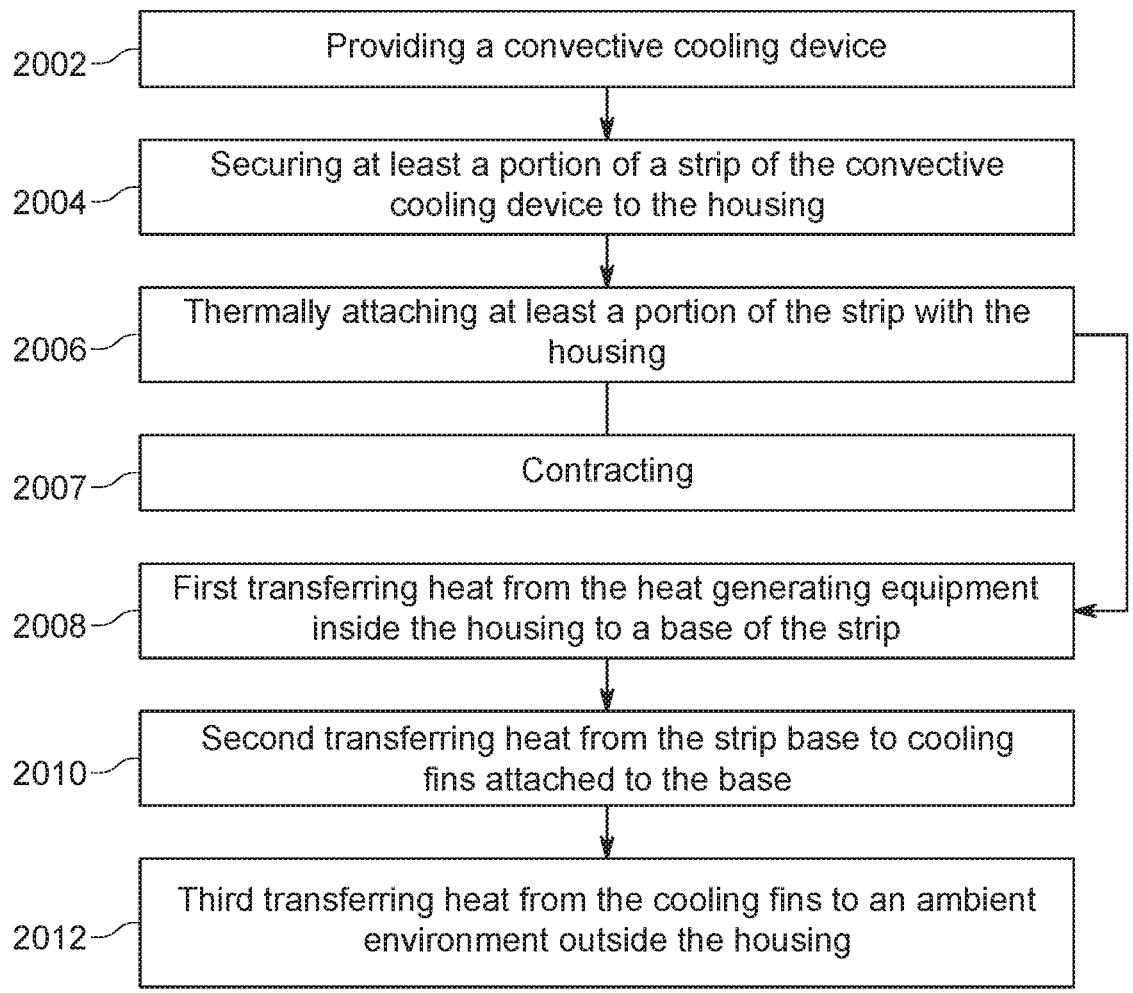
FIG. 18 is a flowchart of a method for cooling a housing according to an embodiment of the disclosure.

FIG. 18 is a flowchart of a method 2000 for cooling a housing 2 according to an embodiment of the disclosure. The method 2000 is applied to cooling heat-generating equipment 12 contained in the housing 2. The method 2000 includes providing 2002 a convective cooling device 1 including an elongate strip 3 of compliant material. In one embodiment, the strip 3 is provided with: a first end 4, a second end 6 opposite the first end 4, and tab (8a, 8b) at each of the first 4 and second 6 ends, each end tab (8a, 8b) formed at an angle (A, A') relative to a plane (10a, 10b) of the strip 3 adjacent the tab (8a, 8b).

The method 2000 includes securing 2004 at least a portion of the strip 3 to a portion of the housing 2. Securing at 2004 includes securing each tab (8a, 8b) of the strip 3 to a portion of the housing 2. The method 2000 further includes thermally contacting 2006 at least a portion of the strip 3 with the housing 2, which in turn includes contacting a lower surface L of a base 22 of the elongate strip 3 to the exterior surface 20 of the housing 2. The method 2000 also includes transferring heat at 2008 from the heat generating equipment 12 inside the cavity 16 of the housing 2 to the base 22 of the elongate strip 3 through the exterior surface 20 of the shell 14, transferring heat at 2010 from the base 22 of the elongate strip 3 to a plurality of cooling fins 24 attached to the base 22, and transferring heat at 2012 from the plurality of cooling fins 24 to an ambient environment 32 outside the housing 2.

It is contemplated that the material of construction of the disclosed convective cooling devices may exhibit a temperature dependent contraction when cooled from an elevated temperature that is beneath the melting point of the material of construction of the disclosed convective cooling devices to an ambient or expected operating temperature. For example, the length (l) of the elongate strip 3 from the first 4 to the second 6 end is a value x centimeters (cm) when the material of construction is at a temperature (T) of A° C., where A° C. is less than the melting point. In the embodiment, the value of l decreases to a value of y cm when T is decreased from A° C. to a value of B° C.

The temperature dependent contraction may facilitate attachment and securing of the disclosed convective cooling devices to the housing 2 to achieve conformance to the contour and/or shape thereof and to facilitate tight thermal attachment and contact between the lower surface L of the disclosed convective cooling devices and the exterior surface 20 of the housing 2. For example, the tabs (8a, 8b) of the convective cooling devices disclosed herein are secured to the housing (e.g., as shown in FIG. 5) while the device is at the elevated temperature T=A° C. Upon cooling to T=B° C., the attached and secured convective cooling device contracts, resulting in a decrease in the end-to-end strip 3 length l from x cm to y cm.

Thus, methods 1000 and 2000 may include contracting steps (step 1016 and step 2007, respectively). This contracting of the disclosed convective cooling devices may stretch and/or elastically or plastically deform the elongate strip 3, at least locally, and enable tighter thermal contact and better cooling performance when used with housing 2 as compared to embodiments that do not attach and/or secure the strip 3 to housing 2 in the elevated temperature state and then cool the strip 3 to the lower temperature are attaching and securing it.

Various embodiments disclosed herein are to be taken in the illustrative and explanatory sense, and should in no way be construed as limiting of the present disclosure.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:
1. A convective cooling device configured for attachment to a housing, comprising:
a body shaped as an elongate strip, the body including upper and lower surfaces extending along a longitudi- nal axis, the body configured to contact the housing along the lower surface for heat transfer from the housing to the body;

a plurality of cooling fins formed integrally with the body and attached along the upper surface, each of the plurality of elongate fins being connected to the upper surface of the elongate strip at one end, and extending away from the upper surface of the elongate strip at another, free end;

a first tab disposed at one end of the elongate strip, and a second tab disposed at another end of the elongate strip;

wherein the body and the plurality of cooling fins are made from an aluminum alloy such that the body is plastically deformable to conform to a shape of the housing when the first and second tabs are connected to the housing and a majority of the lower surface contacts the housing; and wherein the fins are arranged to dissipate heat from the body.

2. The device of claim 1, wherein the first tab forms a first angle relative to the body and the second tab of the elongate strip forms a second angle relative to the body.

3. The device of claim 2, wherein the first angle and the second angle are equal.

4. The device of claim 2, wherein the first tab forms the first angle relative to the body that is not equal to the second angle formed by the second tab relative to the body.

5. The device of claim 2, wherein at least one of the first angle and the second angle is an acute angle.

6. The device of claim 2, wherein at least one of the first angle and the second angle is an obtuse angle.

7. The device of claim 2, wherein at least one of the first angle and the second angle is a right angle.

8. The device of claim 1, wherein the plurality of cooling fins are transversely attached along the upper surface of the elongate strip with respect to the longitudinal axis.

9. The device of claim 1, wherein the body formed into the elongate strip has a U-shape, and wherein the elongate strip is elastically deformable to facilitate at least one of attaching and securing the convective cooling device to the housing.

10. The device of claim 1, wherein the body is disposed in a stretched state when installed onto the housing.

11. The device of claim 1, wherein at least one of the first and second tabs has a free end with a square tip.

12. The device of claim 1, further comprising:

a clamping plate positioned over at least one of the first and second tabs to secure the body to the housing, wherein the clamping plate clamps the at least one of the first and second tabs to the housing.

13. The device of claim 12, wherein the clamping plate includes at least one plate bore and the housing includes at least one housing bore, wherein the position of the at least one plate bore corresponds to the position of the at least one housing bores.

14. The device of claim 1, wherein the free end of at least some of the plurality of cooling fins is rounded.

15. The device of claim 1, further comprising a thermal transfer compound disposed between the lower surface of the body and an exterior surface of the housing.

16. The device of claim 15, wherein the body includes channels formed in the lower surface of the body for distribution of the heat transfer compound in a base of the body.

17. A convective cooling device configured for attachment to a housing, comprising:

a body shaped as an elongate strip, the body including upper and lower surfaces extending along a longitudinal axis, the body configured to contact the housing along the lower surface for heat transfer from the housing to the body;

a plurality of cooling fins attached along the upper surface, each of the plurality of elongate fins being connected to the upper surface of the elongate strip at one end, and extending away from the upper surface of the elongate strip at another, free end;

a first tab disposed at one end of the elongate strip, and a second tab disposed at another end of the elongate strip;

wherein the body is made from a compliant material such that the body conforms to a shape of the housing when the first and second tabs are connected to the housing and a majority of the lower surface contacts the housing; and wherein the fins are arranged to dissipate heat from the body;

further comprising a thermal transfer compound disposed between the lower surface of the body and an exterior surface of the housing;

wherein the body includes channels formed in the lower surface of the body for distribution of the heat transfer compound in a base of the body;

wherein the body further includes a grease fitting extending between the upper and lower surfaces of the body; and an outlet in fluid communication with the grease fitting and positioned on the lower surface of the base of the body.

* * * * *